(12) United States Patent
Zuravleff

(10) Patent No.: US 6,771,337 B2
(45) Date of Patent: Aug. 3, 2004

(54) COMBINED POWER ROUTING AND LIGHT SHIELDING IN AN LCD ARRAY

(75) Inventor: William K. Zuravleff, Mountain View, CA (US)

(73) Assignee: Aurora Systems, Inc., San Jose, CA (US)

( * ) Notice: Subject to any disclaimer, the term of this patent is extended or adjusted under 35 U.S.C. 154(b) by 176 days.

(21) Appl. No.: 09/935,536

(22) Filed: Aug. 22, 2001

(65) Prior Publication Data

US 2003/0038905 A1 Feb. 27, 2003

(51) Int. Cl.[7] .................. G02F 1/1335; G02F 1/136; G02F 1/1343
(52) U.S. Cl. .................. 349/113; 349/43; 349/73; 349/139; 349/143
(58) Field of Search .................. 349/43, 113–115, 349/139, 143–145, 73, 74, 110, 111

(56) References Cited

U.S. PATENT DOCUMENTS

| | | | | |
|---|---|---|---|---|
| 4,874,227 A | * | 10/1989 | Matsukawa et al. | 349/73 |
| 5,331,447 A | * | 7/1994 | Someya et al. | 349/54 |
| 5,767,936 A | * | 6/1998 | Sugimura | 349/116 |
| 5,808,719 A | * | 9/1998 | Fujiwara et al. | 349/157 |
| 5,953,088 A | * | 9/1999 | Hanazawa et al. | 349/110 |
| 6,025,952 A | * | 2/2000 | Stephenson | 359/254 |
| 6,081,305 A | * | 6/2000 | Sato et al. | 349/5 |
| 6,392,734 B1 | * | 5/2002 | Gregory | 349/153 |
| 6,476,563 B2 | * | 11/2002 | Silvestre | 315/169.3 |

* cited by examiner

Primary Examiner—Tarifur R. Chowdhury
(74) Attorney, Agent, or Firm—Henneman & Saunders; Larry E. Henneman, Jr.

(57) ABSTRACT

A reflective LCD array (10) having a plurality of mirrors (40) in a mirror layer (14) of material layers (12). Underlying the mirror layer (12) are at least a second metal layer (18) and a third metal layer (20). The second metal layer (18) and the third metal layer (20) will each have a first plurality of power traces (50) and (51), arrayed such that the power traces (50) and (51) generally completely underlie a plurality of gaps (44, 46) between the mirrors (40). The power traces (50) are positioned to shield light (30) from reaching a plurality of silicon junctions (26) where traces on a poly layer (22) intersect traces on a diffusion layer (24).

20 Claims, 4 Drawing Sheets

COMBINED POWER ROUTING AND LIGHT SHIELDING IN AN LCD ARRAY

TECHNICAL FIELD

The present invention relates to the field of integrated circuit manufacture, and more specifically to an improved method and construction for the manufacture of light reflective liquid crystal display ("LCD") arrays. The predominant current usage of the present inventive combined power routing and light shielding is in the construction of light reflective LCD arrays for projection display devices, wherein it is desirable to provide high capacitance and low resistance power routing and further where it is desirable to provide light shielding to prevent light from reaching silicon circuit layers.

BACKGROUND ART

When light reaches semiconductor junctions of an LCD array a current is produced by a photoelectric effect, which will interfere with the desired operation of the array. Ideally, the mirrors of a reflective array will be positioned to fill as much of the surface area as possible, as this will result in the brightest and clearest image. Further, the mirrors block light from reaching the semiconductor junctions and so, the greater quantity of the total surface is composed of mirror surface, the less problem there is with light reaching the semiconductor junctions. However, no matter what the arrangement of the mirrors might be, there we still be some space there between where light will potentially reach the semiconductor junctions and will, thus, cause the unwanted current discussed above.

It is known in the art to provide light shielding in the construction of light reflective LCD arrays. Primarily, this has been in the form of an extra layer to shield the light. Of course, this adds extra expense to the manufacturing process, but the solution has been thought to be worth such expense in the prior art. Another known method has been to use "dummy" (non-functioning) traces on an existing layer to block the light. This does accomplish the light blocking function. However, an obvious disadvantage to this method is that the dummy traces take up much needed real estate of the chip layout.

It would be beneficial to have a method or means for shielding light which might pass between the mirrors in a light reflective LCD array which does not involve extra complexity and/or expense in the construction of the array. It would be an additional benefit if such solution also provided additional advantages not contemplated in the prior art. However, to the inventor's knowledge, no such solution to this problem has existed prior to the present invention.

SUMMARY

Accordingly, it is an object of the present invention to provide an apparatus and method for shielding light which might pass between the mirrors in a reflective LCD array.

It is another object of the present invention to provide an apparatus and method for shielding light away from semiconductor junctions in a reflective LCD array.

It is still another object of the present invention to provide an apparatus and method for shielding light in a reflective LCD array which does not require layers or materials in addition to those used to accomplish other functions in the array.

It is yet another object of the present invention to provide a method and apparatus for routing power busses in a reflective LCD array such that light is shielded from reaching semiconductor junctions.

It is still another object of the present invention to provide an apparatus and method for routing power in an LCD array which is very low in resistance.

It is yet another object of the present invention to provide an apparatus and method for routing power in an LCD array having high capacitance between lines.

Briefly, a known embodiment of the present invention is a reflective LCD array having metal layers with power distribution patterns aligned such that they completely fill gaps between the mirrors of the array. A first metal layer will have power distribution lines arrayed along generally vertical paths and positioned between vertical gaps in the mirrors. A second metal layer will have power distribution lines arrayed along generally horizontal paths and positioned between horizontal gaps in the mirrors. The inventive arrangement allows for very wide power distribution traces without wasting valuable layout space. Such wide parallel traces provide the additional advantage of having very low resistance and high capacitance there between.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

DETAILED DESCRIPTION

Figure 1:
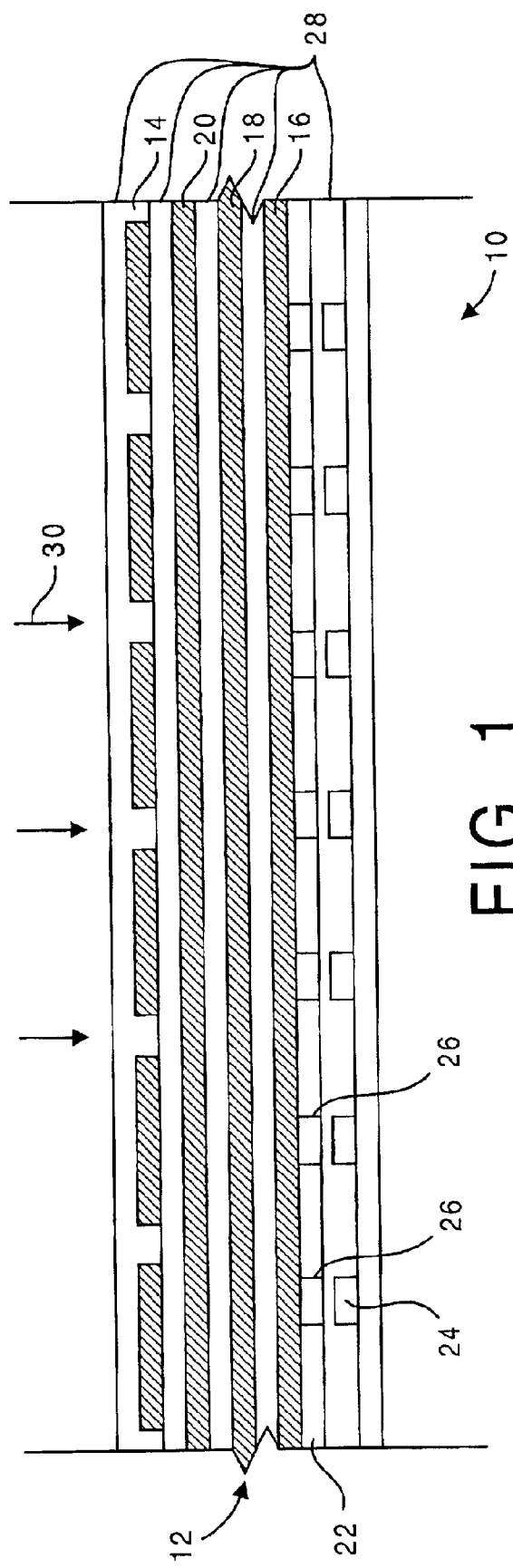
FIG. 1 is a diagrammatic side elevational view of a reflective LCD array, according to the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is a unique reflective LCD array. A portion of the inventive reflective LCD array is depicted in a diagrammatic (not to scale) side elevational view in FIG. 1 and is designated therein by the general reference character 10. The reflective LCD array 10 has, not unlike conventional prior art devices, a plurality of material layers 12. The embodiment discussed by way of example herein has a mirror layer 14, a first metal (M1) layer 16, a second metal (M2) layer 18, and a third metal (M3) layer 20. In the present example also are a polysilicon (recrystallized silicon) layer 22 and a diffusion layer 24. One skilled in the art will recognize that the areas where traces on the poly layer 22 mask those of the diffusion layer 24 are semiconductor junctions 26. Also visible in the view of FIG. 1 are a plurality of silicon dioxide insulating layers 28.

One skilled in the art will recognize that a lesser or greater quantity of layers might be used to construct such an array. The example of FIG. 1 is intended only to further the understanding of the present invention. Also, one skilled in the art will recognize that the example of FIG. 1 is not an exhaustive list of all of the components of such an array. Additional features such as a substrate on which the material layers 12 are built, a case, external electrical connectors, and the like are omitted from the view of FIG. 1 as being unnecessary to an understanding of the invention. Shown diagrammatically in FIG. 1 are several arrows representing light 30 such as might be directed toward and through the mirror layer 14 of the reflective LCD array 10.

Figure 2:
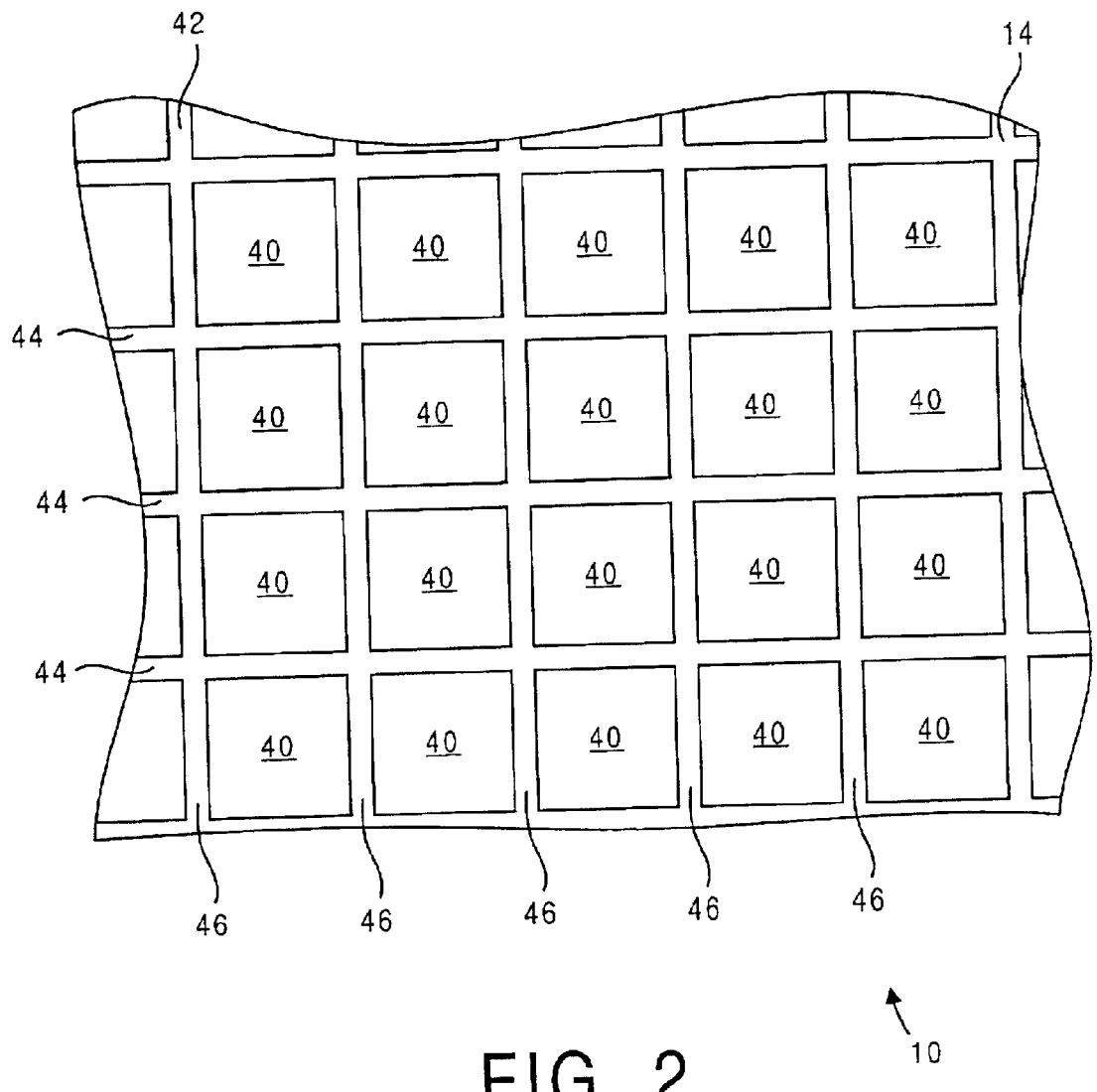
FIG. 2 is a diagrammatic top plan view of a portion of the reflective LCD array of FIG. 1, showing the layout of the mirrors thereof.

FIG. 2 is a diagrammatic top plan view of a portion of the reflective LCD 10 array of FIG. 1, showing the layout of a plurality of minors 40 thereon. The mirrors 40 are in the mirror layer 14 (FIG. 1), previously discussed herein in relation to FIG. 1, and can be viewed through the protective insulating layer 28 which is over the mirror layer 14. In the view of FIG. 2 it can be seen that there are gaps 42 between the mirrors 40 wherethrough light 30 (FIG. 1) might pass. Since, in this present example, the generally square mirrors 40 are arrayed in rows and columns, the gaps 42 may be referred to as horizontal gaps 44 and vertical gaps 46, when viewed from the perspective of FIG. 2.

Figure 3:
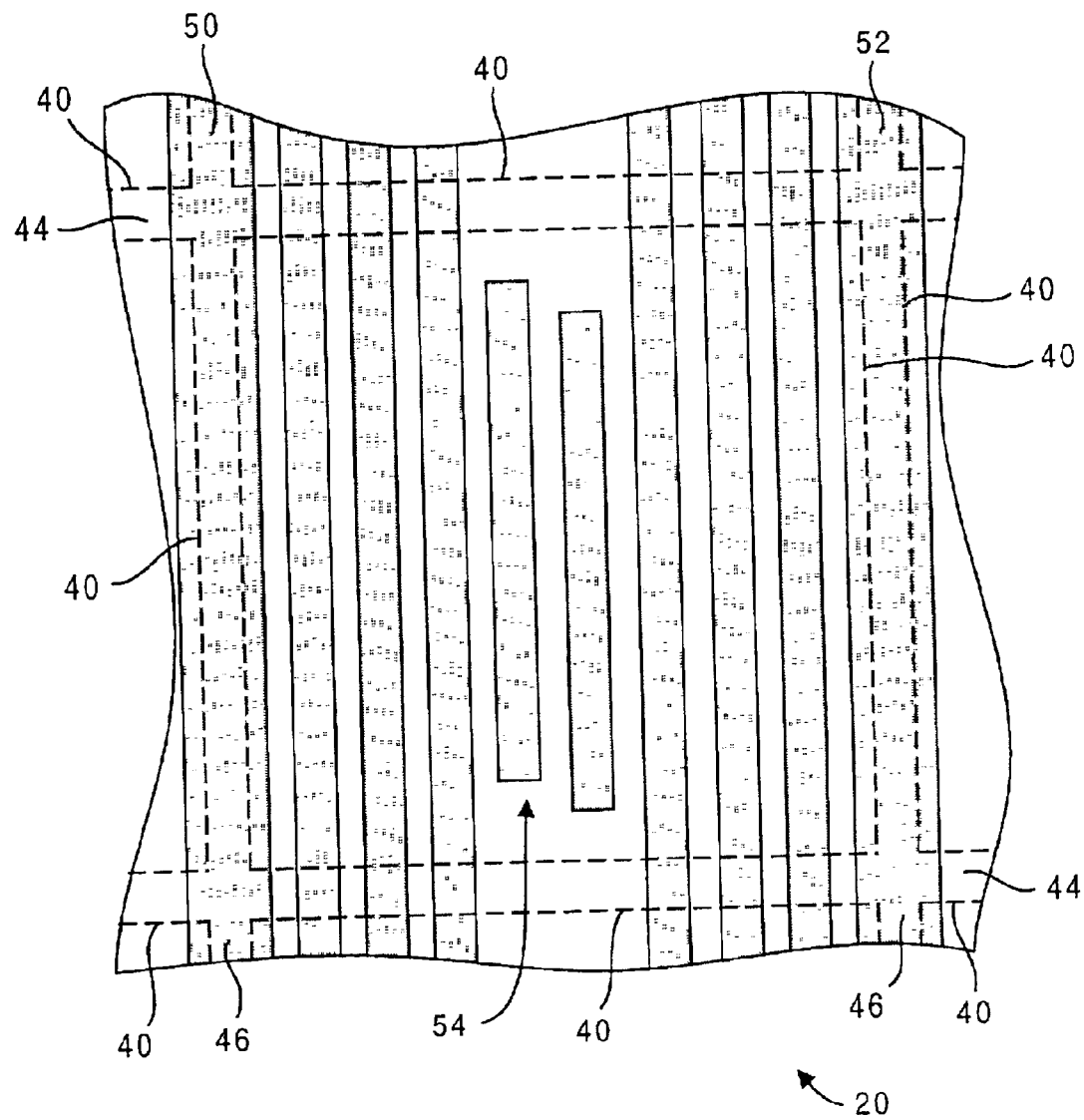
FIG. 3 is a layout diagram of the third metal (M3) layer of the present example of the reflective LCD array 10 of FIGS. 1 and 2.

FIG. 3 is a layout diagram of a portion of the third metal (M3) layer 20 of the present example of the reflective LCD array 10. In this diagram, dotted lines are superimposed thereon to represent the boundaries of the mirrors 40 which overlie the third metal (M3) layer 20. As can be seen in the view of FIG. 3, the circuitry shown is primarily that underlying one of the mirrors 40, and extended to show that underlying a small portion of the mirrors 40 adjacent thereto. One skilled in the art of integrated circuit layout will be familiar with the diagram of FIG. 3 which is conventional in many respects. A unique aspect visible in the diagram of FIG. 3 is that a V0 power trace 50 and a V1 power trace 52 border the circuitry shown on the left and right, respectively, as seen from the perspective of FIG. 3. The V0 power trace 50 and the V1 power trace 52 are primary power "buss" traces on the third metal (M3) layer 20 in this present example. One skilled in the art will recognize that the circuitry under the mirrors 40 (FIG. 2) is mirrored under adjacent examples of the mirrors 40 such that alternate examples will be the mirror image of an example immediately adjacent thereto. According to the present example, the V0 and V1 traces 50, 52 are not repeated in such mirror images, but rather are shared by adjacent examples. This is illustrated in the view of FIG. 3 by the fact that a portion of two of the adjacent mirrors 40 are visible in the view of FIG. 3. As can be seen in the view of FIG. 3, the V0 and V1 traces 50, 52 more than fill the vertical gaps 46 between the mirrors 40. Additional circuitry 54 visible in the view of FIG. 3 is generally conventional in nature and will not be further discussed herein.

Figure 4:
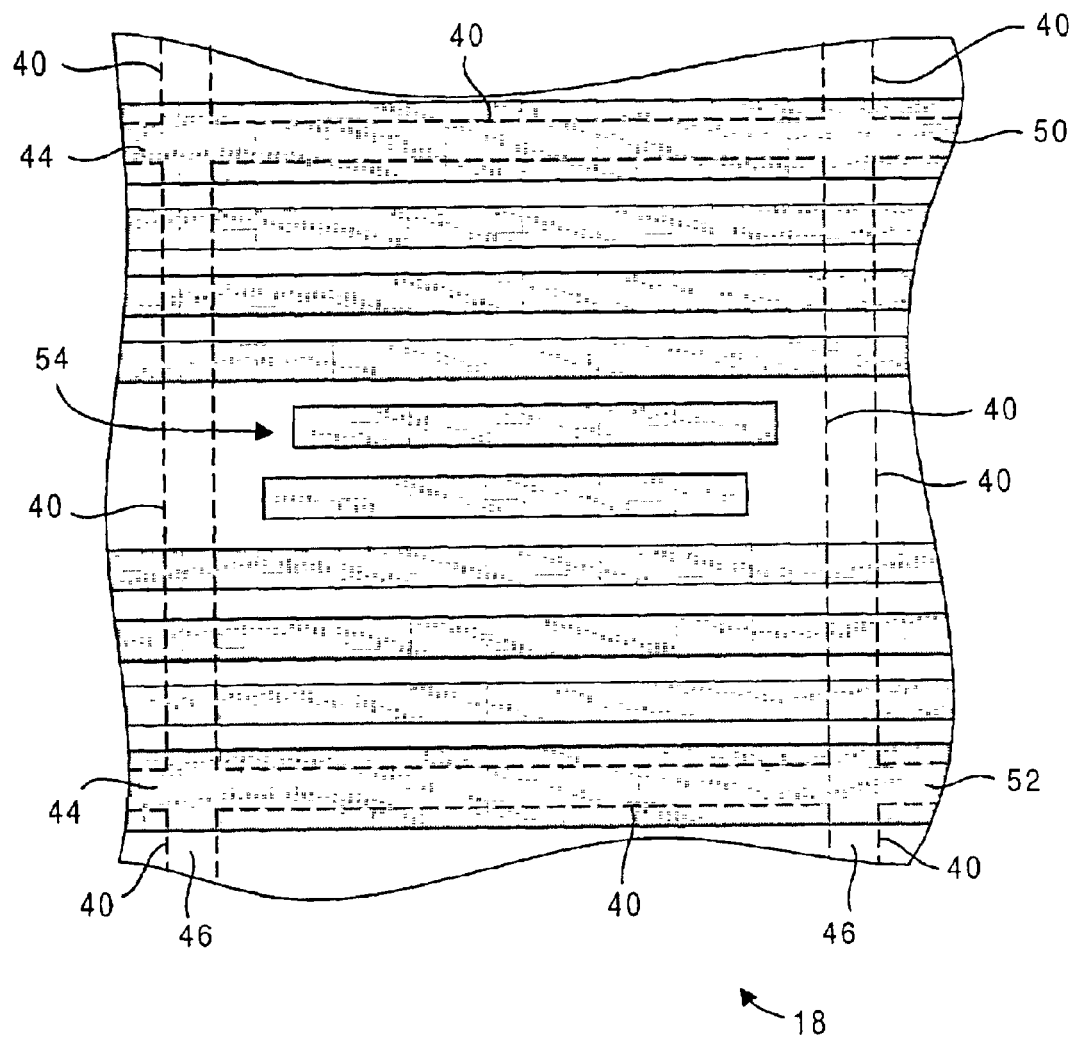
FIG. 4 is a layout diagram of the second metal (M2) layer of the present example of the reflective LCD array of FIGS. 1 and 2.

FIG. 4 is a layout diagram of a portion of the second metal (M2) layer 18 of the present example of the reflective LCD array 10. As in the view of FIG. 3, in this diagram, dotted lines are superimposed thereon to represent the boundaries of the mirrors 40 which overlie the second metal (M2) layer 18. Visible in the diagram of FIG. 4 are additional incidences of the V0 power trace 50 and the V1 power trace 52 bordering the circuitry underlying pixel mirror 40 on the top and bottom, respectively, as seen from the perspective of FIG. 4. The circuitry of FIG. 4, which is also under the mirrors 40 (FIG. 2) as can be seen in FIG. 1, is also mirrored under adjacent examples of the mirrors 40 vertically (as viewed from the perspective of FIG. 4) such that alternate examples will be the mirror image of an example immediately adjacent thereto. As with the example of the third metal (M3) layer 20 discussed previously herein in relation to FIG. 3, according to the present example, the V0 and V1 traces 50, 52 are not repeated in such mirror images, but rather are shared by adjacent examples. This is illustrated in the view of FIG. 4 by the fact that a portion of the adjacent mirrors 40 are visible in the view of FIG. 4. As can be seen in the view of FIG. 4, the V0 and V1 traces 50, 52 more than fill the horizontal gaps 44 between the mirrors 40.

Various modifications may be made to the invention without altering its value or scope. For example, different arrangements of the additional circuitry 54 could be incorporated while retaining the inventive aspects. Also, the power traces 50 and 52 could carry different power in addition to or instead of the V0 and V1 power discussed in relation to the example herein. Another example of an obvious variation of the invention would be to use material layers other than those specifically discussed herein to include the inventive elements.

All of the above are only some of the examples of embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive reflective LCD array 10 is intended to be widely used in video imaging systems, particularly in projection video devices, wherein image clarity and brilliance are of great importance. According to the present invention, image quality is improved due to the prevention of stray currents which might otherwise be caused by the photoelectric effect creation of currents caused by light reaching the semiconductor junctions within the reflective LCD array 10. Where in the prior art a great deal of extra metal has been required, either as dummy metal in an existing array or in an entirely separate level, the present invention takes advantage of the fact that a substantial amount of metal is required to accomplish the desired light blocking effect. Indeed, the relatively wide metal traces 50, 52 provide a low resistance (and, therefore, lower voltage drop) path for the necessary power. In the example specifically discussed herein, V0 is a constant DC voltage, and the V1 power is switched at a relatively low frequency (in the kilohertz range). The wide power traces 50 and 52 also have the effect of providing a high capacitance (due to the large effective plate size) both between each other and to surrounding effective capacitive plate structures. While such effect would be very undesirable in signal lines, which must switch in the megahertz range, this is an additional desirable effect in the power lines where a smoothed voltage is desirable.

Since the reflective LCD arrays 10 of the present invention may be readily produced and integrated with existing video imaging systems and devices, and since the advantages as described herein are provided, it is expected that it will be readily accepted in the industry. For these and other reasons, it is expected that the utility and industrial applicability of the invention will be both significant in scope and long-lasting in duration.

NOTICE: This correspondence chart is provided for informational purposes only. It is not a part of the official Patent Application.

CORRESPONDENCE CHART

10 REFLECTIVE LCD ARRAY
12 MATERIAL LAYERS
14 MIRROR LAYER
16 FIRST METAL (M1) LAYER
18 SECOND METAL (M2) LAYER
20 THIRD METAL (M3) LAYER
22 POLY LAYER
24 DIFFUSION LAYER
26 SILICON JUNCTION
28 INSULATING LAYERS
30 LIGHT
40 MIRRORS
42 GAPS (BETWEEN MIRRORS 40)
44 HORIZONTAL GAPS
46 VERTICAL GAPS
50 V0 POWER TRACE
52 V1 POWER TRACE
54 ADDITIONAL CIRCUITRY

I claim:

1. A light reflective LCD array, comprising:
   a plurality of mirrors arrayed in a plurality of rows and a plurality of columns such that there are horizontal gaps between the rows and vertical gaps between the columns;
   a first metal layer having a first plurality of power traces arrayed generally horizontally such that said first plurality of power traces generally underlies said horizontal gaps;
   a second metal layer having a second plurality of power traces arrayed generally vertically such that said second plurality of power traces generally underlies said vertical gaps; and
   at least one circuitry layer underlying said first and said second metal layers; and wherein
   said first and said second metal layers prevent light from impinging on said circuitry layer, and said first plurality of power traces and said second plurality of power traces are power routing busses.

2. The light reflective LCD array of claim 1, wherein: said first plurality of power traces completely underlies said horizontal gaps.

3. The light reflective LCD array of claim 1, wherein: said second plurality of power traces completely underlies said vertical gaps.

4. The light reflective LCD array of claim 1, wherein: said first plurality of power traces includes a plurality of first voltage traces, and a plurality of second voltage traces.

5. The light reflective LCD array of claim 4, wherein: the first voltage traces and the second voltage traces are positioned in alternate iterations of the horizontal gaps.

6. The light reflective LCD array of claim 1, wherein: said second plurality of power traces includes a plurality of first voltage traces, and a plurality of second voltage traces.

7. The light reflective LCD array of claim 6, wherein: the first voltage traces and the second voltage traces are positioned in alternate iterations of the vertical gaps.

8. In a reflective LCD array having a plurality of imaging surfaces arranged in rows and columns with gaps there between and an underlying circuitry layer, an improvement comprising:
   a plurality of traces between said circuitry layer and said imaging surfaces and arranged such that said gaps are generally underlain by said traces such that light passing through said gaps is blocked by said traces and thereby prevented from impinging on said circuitry layer.

9. The LCD array of claim 8, wherein: said traces carry power for the LCD array.

10. The LCD array of claim 8, wherein:
    at least some of the gaps which are positioned in a first direction are underlain by a first plurality of the traces on a first metal layer; and
    at least some of the gaps which are positioned in a second direction are underlain by a second plurality of the traces on a second metal layer.

11. The LCD array of claim 10, wherein: the first direction is generally perpendicular to the second direction.

12. The LCD array of claim 10, wherein: the first direction is a generally horizontal direction; and the second direction is a generally vertical direction.

13. The LCD array of claim 8 wherein: the imaging surfaces are mirror surfaces.

14. The LCD array of claim 8, wherein: said plurality of traces generally block all of the gaps.

15. A method for blocking light from impinging on a circuitry layer of a reflective LCD array having a plurality of imaging surfaces, said method comprising:
    arranging a first plurality of traces on a first metal layer between said circuitry layer and said imaging surfaces such that said first plurality of traces blocks light coming through a first plurality of spaces in the array, which would impinge on said circuitry layer; and
    arranging a second plurality of traces on a second metal layer between said circuitry layer and said imaging surfaces such that said second plurality of traces blocks light coming through a second plurality of spaces in the array, which would impinge on said circuitry layer.

16. The method of claim 15, wherein: said first plurality of traces and said second plurality of traces are power traces for the LCD array.

17. The method of claim 15, wherein: said first plurality of traces are on a first metal layer; and said second plurality of traces are on a second metal layer.

18. The method of claim 15, wherein: said first plurality of spaces and said second plurality of spaces are gaps between mirror surfaces on the array.

19. The method of claim 15, wherein:
    said first plurality of spaces are arrayed generally horizontally; and
    said second plurality of spaces are arrayed generally vertically.

20. The method of claim 15, wherein: said first plurality of traces and said second plurality of traces underlie said first plurality of spaces and said second plurality of spaces.

* * * * *